US011136102B2

(12) United States Patent
Rembach

(10) Patent No.: US 11,136,102 B2
(45) Date of Patent: *Oct. 5, 2021

(54) SYSTEM FOR PROVIDING POWER TO A MARITIME VESSEL

(71) Applicant: THRUSTMASTER OF TEXAS, INC., Houston, TX (US)

(72) Inventor: Paul Rembach, Houston, TX (US)

(73) Assignee: THRUSTMASTER OF TEXAS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,768

(22) Filed: Aug. 14, 2019

(65) Prior Publication Data

US 2019/0389552 A1 Dec. 26, 2019

Related U.S. Application Data

(63) Continuation of application No. 16/386,049, filed on Apr. 16, 2019, now Pat. No. 10,399,654, which is a continuation of application No. 12/313,732, filed on Nov. 24, 2008, now Pat. No. 7,980,905.

(60) Provisional application No. 61/004,397, filed on Nov. 25, 2007.

(51) Int. Cl.
*B63H 21/20* (2006.01)
*B63J 3/02* (2006.01)
*B63J 3/04* (2006.01)
*B63H 21/17* (2006.01)

(52) U.S. Cl.
CPC ............. *B63H 21/20* (2013.01); *B63H 21/17* (2013.01); *B63J 3/02* (2013.01); *B63J 3/04* (2013.01); *B63J 2003/043* (2013.01); *Y02T 70/5236* (2013.01)

(58) Field of Classification Search
CPC ........ B63H 21/00; B63H 21/17; B63H 21/20; B63J 3/00; B63J 3/02; B63J 3/04; B63J 2003/043; Y02T 70/5236
USPC .......................................................... 440/6
See application file for complete search history.

(56) References Cited

U.S. PATENT DOCUMENTS 10,399,654 B2 * 9/2019 Rembach ................... B63J 3/02

* cited by examiner

*Primary Examiner* — Lars A Olson
(74) *Attorney, Agent, or Firm* — Nolte Lackenbach Siegel

(57) ABSTRACT

A drive system mounted to the hull of a buoyant vessel, the drive system having a rectifier, a generator, an AC bus in communication with shore power or a charging system and the rectifier, a DC bus in communication with the rectifier, at least one energy storage system, an inverter, a prime mover, a load regenerating device, and a control and monitor system which has predefined specifications for at least one of: storage units of at least one energy storage system; stored therein and wherein the control and monitor system is adapted to: automatically control the DC/DC converters, relieve a current draw from one or more storage units, provide charging current, and automatically draw power and redirect energy.

17 Claims, 4 Drawing Sheets

SYSTEM FOR PROVIDING POWER TO A MARITIME VESSEL

RELATED APPLICATION

The present application is a continuation of and claims priority to U.S. patent application Ser. No. 16/386,049 filed on Apr. 16, 2019. U.S. patent application Ser. No. 16/386,049 is a continuation of U.S. patent application Ser. No. 12/313,732, filed on Nov. 24, 2008, which claims priority to U.S. Provisional Patent Application Ser. No. 61/004,397, filed on Nov. 25, 2007. The referenced are hereby incorporated in their entirety.

FIELD

The present embodiment generally relates to a system for providing power to a marine vessel. Still more particularly, the present invention discloses a method and apparatus wherein, depending on the mode of operation, a combination of batteries, and/or other stored energy resources and engines provides power to a marine vessel such as a tugboat, a ferry boat, or an offshore service vessel.

BACKGROUND

A need exists for a carbon reducing drive system.
The present embodiments meet these needs.

BRIEF DESCRIPTION OF THE DRAWINGS

The detailed description will be better understood in conjunction with the accompanying drawings as follows.

Figure 1:
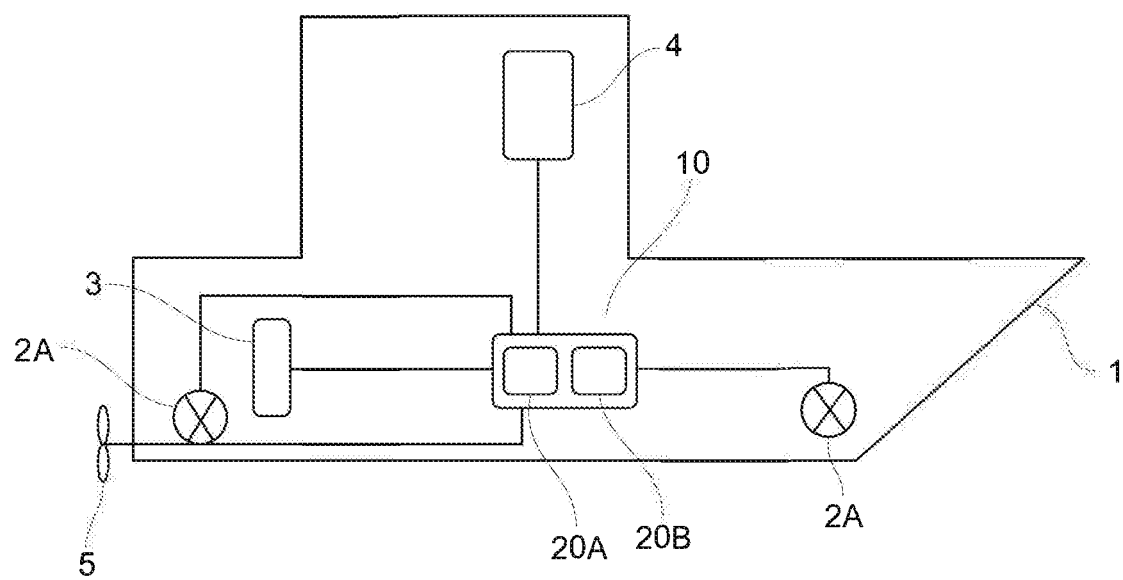
FIG. 1 depicts a side view of a buoyant vessel with a drive system according to an embodiment.

The present embodiments are detailed below with reference to the listed Figures.

DETAILED DESCRIPTION OF THE EMBODIMENTS

Before explaining the present drive system in detail, it is to be understood that the drive system is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

Buoyant vessels, can be marine vessels such as tugboats and ferry boats. A tugboat, or tug, is a boat used to maneuver, primarily by towing or pushing, other marine vessels in harbors, over the open sea or through rivers and canals. They are also used to tow barges, disabled ships, or other equipment like tow boats. Further, they are used to extinguish fires in water locations where land equipment cannot perform firefighting operations.

Presently, marine vessels, such as ferry boats and tugboats are powered by diesel engines. One disadvantage of diesel engines is that diesel engines emit a large amount of pollutants including compounds that contain carbon such as carbon dioxide.

Another disadvantage is that diesel engines consume a large amount of fuel while performing routine tug boat operations. Another disadvantage is that the use of diesel engines requires a large space for the drive lines in the tugboat. Still another disadvantage is that diesel engines are very noisy and contribute to elevated levels of noise pollution. The present invention overcomes these disadvantages.

The present invention relates to a drive system to power a buoyant vessel, such as a tugboat, wherein the drive system utilizes an ESS combination of stored energy batteries, sored energy battery/capacitors and generators. The generators are only used in the towing mode, that is, when the tugboat is attached to a barge or when charging the batteries. Other modes of operation the buoyant vessel can operate entirely from ESS (stored energy).

The use of stored energy ESS dramatically reduces carbon emission while meeting or exceeding the functionality, safety and power requirements of present day marine vessels, including tugs. Such carbon emission reduction can be as high as 90 percent when compared to the present power drive designs. Further the use of stored energy ESS substantially reduces power consumption, the drive line space requirements and the noise level.

The present invention relates to a drive system having a port section and/or a starboard section.

The port section and the starboard section may be operated independently or may be cross connected at several points, as needed. Components of the port section are similar to the components of the starboard section.

The port section and the starboard section each include a diesel engine and generator, an optional AC bus, a rectifier, a battery bank, a DC bus and inverters that drive the motors in the buoyant vessel, a shore power connection and a fire pump motor.

The AC bus is connected to the generator and the shore power connection to receive electrical power therefrom.

The fire pump motor is connected to receive electric power directly from the generator when activated. The fire pump motor can also receive power from a shore power source.

The generator provides a variable voltage that can range from 10% under to 10% over a rated voltage and the generator is normally connected to the rectifier.

The generator prime mover (such as diesel engine) can operate in the variable frequency mode to optimize the KW loading on the prime mover.

The rectifier converts alternating current from the AC bus to direct current which is supplied to the DC bus.

The DC voltage from the rectifiers is used by the ESS for recharging and by the inverters to drive the motors loads.

The ESS is bi-directionally connected to the DC bus to receive charging current from the generator and other sources and to provide power to the DC bus which in turn powers the DC to AC inverters.

The inverters are capable of handling regenerated power which is regenerated under certain conditions, such as power generated by a winch when a load is dropping and power generated by a thruster when rotation is reversed or energy is harvested from the vessel hull when the buoyant vessel slows down.

Smaller amounts of power may also be regenerated from the steering gear or from the use of a thruster.

The batteries in the battery bank are connected to automatically absorb regenerated power, either by displacing load current or by discharging. If the voltage in the DC bus reaches a certain level, namely, about 750 volts (as adjusted for ESS battery temperature) a chopper diverts the excess regenerated power to an air cooled grid resistor. Shore power available from the AC bus can also be used to charge the batteries of the battery bank through an inverter. A redundant control system is provided for each port and starboard section.

The drive system is designed to operate in three different modes, namely, the green mode, the tow mode and the firefighting mode.

Green mode is the default mode of operation. In the green mode the vessel is supplied power only by the ESS energy banks without utilizing the diesel engines for ship propulsion and/or ship service. The control system energizes generators only when needed to provide peak power or ESS charging. The ESS banks hold enough energy to sustain incidental loads for over 8 hours between charges; however ESS energy life is increased when more shallow discharge cycles are used. The generators come on line automatically based on a combination of the load and the ESS state of charge. In the green mode, the minimal use of diesel engines cause substantial reduction in noise level, energy consumption and carbon emissions. Green mode is designed for operating the vessel between locations when it is not towing another vessel and for dockside operations.

The tow mode may be manually selected by the operator. Selecting tow mode energizes the diesel engines and generators so that power will be available immediately to support peak power demands. The voltage from the generators maintains a float charge on the ESS banks except at very heavy loads, where power is drawn from the ESS banks to supplement the generators. The diesel engine RPMs are adjusted to maintain optimal KW loading on the diesel engines.

The firefighting mode may be manually selected by the operator. Firefighting mode energizes diesel engines and generators simultaneously, and gives priority to the fire pumps that are driven by the fire pump motors.

The use of the combination of ESS banks and generators allows for reduction of use of generators in certain operating modes and, more particularly, in the green mode.

Generators are only used in the towing mode, firefighting mode or when charging the ESS storage. As a result, fuel consumption is reduced, lowering fuel costs and simultaneously lowering carbon emissions from the buoyant vessel. The replacement of diesel engines and generators with ESS banks reduces the size of the drive line and the overall space required for the system within the hull.

Identical interchangeable modules are used in the inverters. Interchangeable modules are automatically reprogrammed and interchangeable modules can be replaced at sea quickly thereby reducing down time and maintenance costs.

The novel drive system can be mounted to the hull for balancing power between electrical devices on a buoyant vessel using a digital signal processor that enables a particular module to respond instantly and correctly to changing voltages, currents, temperatures, thrusters and propellers of the buoyant vessel.

The drive system includes a rectifier for converting AC current to DC current.

The drive system includes a generator connected to the rectifier.

The drive system includes an AC bus in communication the rectifier.

The drive system includes a DC bus in communication with the rectifier.

The drive system includes a DC/DC converter in communication with the DC bus and the ESS The drive system includes at least one ESS energy storage system with at least one storage unit in bi-directional communication with the DC/DC converter; wherein the DC/DC converter selectively controls bidirectional charging and discharging of the at least one ESS energy storage system.

The drive system includes an inverter in communication with the DC bus.

The drive system can power a prime mover; using a load regenerating device connected to the inverter. A rectifier can be configured to provide regenerated power from the prime mover, load regenerating device, or combinations thereof to the energy storage system; and a control and monitor system can be used in communication with the DC/DC converter, one or more storage units of the at least one energy storage system, and the generator.

The control and monitor system has predefined specifications for at least one of: storage units of at least one ESS energy storage system; stored therein, and wherein the control and monitor system is adapted to: a. automatically control the DC/DC converter when one or more storage units of an ESS energy storage system or one of the energy storage systems falls below a predetermined load, or the charge level of one or more of the storage units of an ESS energy storage system or one of the energy storage systems is depleted past a preset limit of the charge level thereof; b. automatically relieve a current draw from one or more storage units of an ESS energy storage system or one of the energy storage systems; c. automatically provide charging current to the one or more storage units of an energy storage system or one of the ESS energy storage systems; and d. automatically draw power from at least one of the load regenerating device and the generator, and redirect energy from at least one of the load regenerating device and the generator to the DC/DC converter and then to one or more storage units of an energy storage system or to an energy storage systems.

The ESS storage system includes at least one of: a battery, a battery-ultra capacitor, an ultracapacitor, and capacitors.

In embodiments, the control and monitor system has predefined specifications for at least one of: storage units of at least one ESS energy storage system, and at least one ESS energy storage system; stored therein and wherein the control and monitor system is adapted to: monitor at least one of: the storage units of at least one energy storage system and the energy storage system and to automatically start the prime mover.

In embodiments, the control and monitor system has predefined specifications for at least one of: storage units of at least ESS one energy storage system, and at least one energy storage system; stored therein and wherein the control and monitor system is adapted to: control the DC to DC converters to ensure one or more storage units of an ESS energy-storage system or one or more ESS energy storage systems are not overcharged.

In embodiments, a plurality of voltage sensors are used for scaled voltage feedback of the monitored energy storage units or systems when one or more storage units of an energy storage system or one of the energy storage systems voltage is reduced below preset level and a plurality of temperature sensors are used for determining temperature of the ESS energy storage units.

In embodiments, the control monitor system reads the plurality of voltage sensors, the plurality of temperature sensors, the thruster load and the propeller load.

In embodiments, the control and monitor system is configured to monitor and control the DC/DC converter levels to control a charging rate of the one or more storage units of an ESS energy storage system or one of the ESS energy storage systems.

In embodiments, the load regenerating device is a winch motor, steering motors, thruster motors, propeller motor, fire pump motors, motor control centers, or combinations thereof.

In embodiments, the control and monitor system prevents generator excitation levels from exceeding a maximum excitation level of the DC bus.

In embodiments, the DC bus in communication with the rectifier is at least one: a split DC bus or a non-split DC bus.

In embodiments, the from 2 to 10 DC bus can be used.

In embodiments, the ESS energy storage system has a chopper connected to a resistor for dissipating excess power if one or more storage units or one or more ESS energy storage systems are offline or full of power.

In embodiments, from 1 inverter to 50 inverters.

In embodiments, the control and monitor system comprises a communication network.

In embodiments, the communication network is at least one of: a global communication network, a local communication network, a cellular communication network, the internet, and a satellite communication network.

In embodiments, the generator and the prime mover can be variable speed, and wherein the generator is variable voltage to control fuel efficiency.

In embodiments, each AC/DC bus is in electrical communication with shore power or a charging system.

In embodiments, the buoyant vessel has a navigation system for operating thrusters, propellers and drive system communicates with the control and monitor system.

The following definitions are used herein:

The term "energy drive system" refers to batteries, capacitors, or combinations thereof.

The term "fuel system" can be any fuel delivery system that operates the generators.

The term "generators" refers to diesel electric generators, natural gas generators, hydrogen fuel cells, or other types of gen sets usable in floating vessels.

The term "navigation system" refers to the controller, typically on the bridge of a buoyant vessel, that interfaces with the thrusters, generators, the master control for the drive system.

The term "propeller" can be a propeller on a drive shaft.

The term "thrusters" refers to any marine propulsion unit, including 360 degree azimuthing thrusters, removable thrusters, tunnel thrusters, including non-azimuthing thrusters.

Referring now to FIG. 1, is shown a hull 1 with a drive system 10 mounted within the hull 1. The hull has thrusters 2A and 2B connected to the drive system which has a pair of generators 20A, and 20B.

The hull has a fuel system 3 connected to the generators in the drive system 10.

The hull or a superstructure on the hull, or an upper deck in the case of a ferry or tug-like marine vessel has a navigation system 4 electronically connected to the drive system 10 for directionally orienting the buoyant vessel, such as by dynamic positioning.

The hull has at least one propeller 5 which can be one or more azimuth thrusters for orienting the buoyant vessel, or any other type of propulsion system needing variable controlled power supplied.

Figure 2:
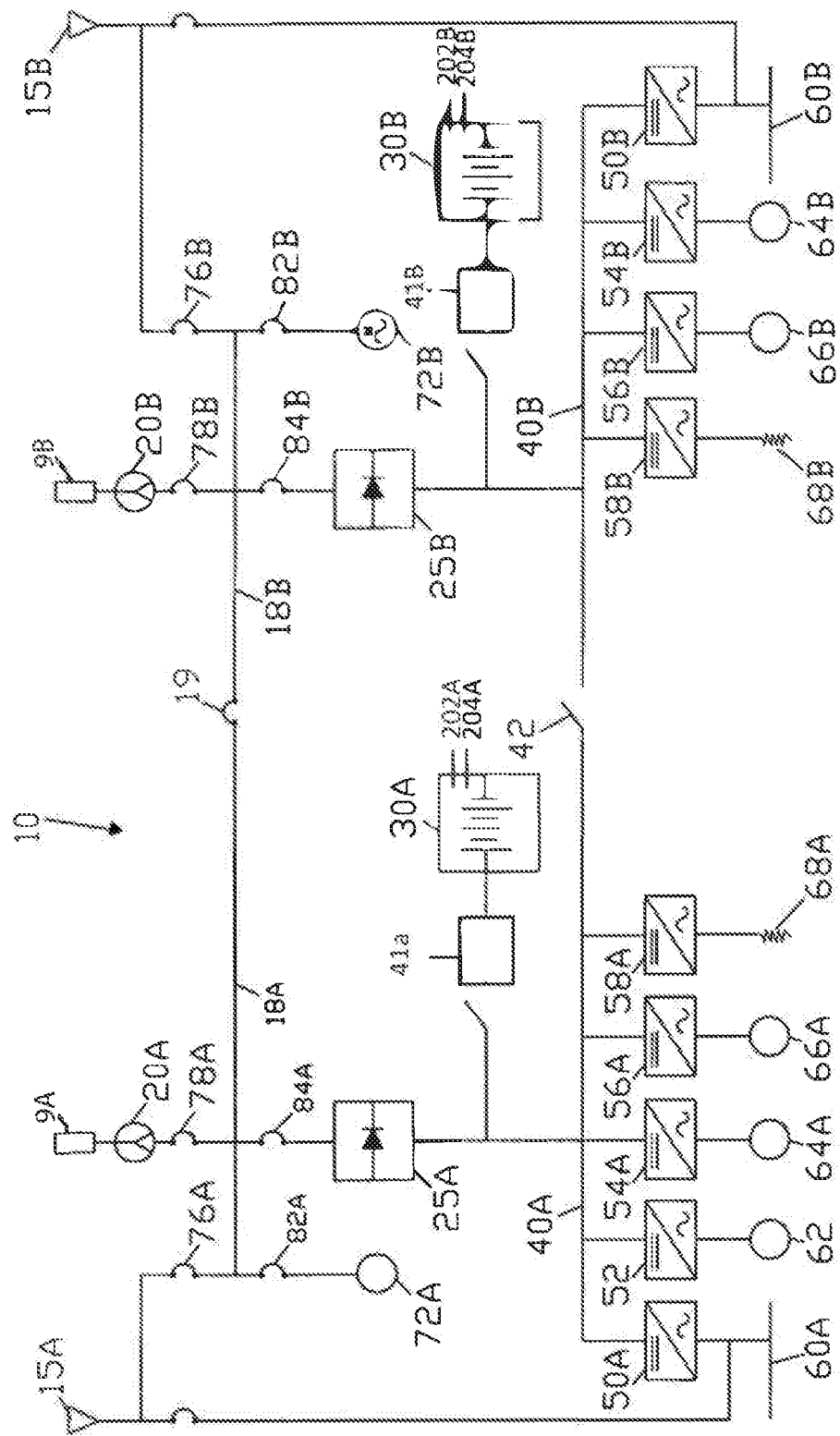
FIG. 2 is a schematic illustrating the major functional systems of the drive system of the present invention.

Referring now to FIG. 2 there is shown a drive system 10 that is mounted within the hull of the buoyant vessel.

The drive system 10 is a comprised of a port (left) section and a starboard (right) section wherein each section may be operated independently or may be cross connected at several points, as needed.

Components of the port section of FIG. 2 are identical to the components of the starboard section and similar components are designated by the same numeral followed by the letter "A" for the components of the port section and letter "B" for the components of the starboard section.

Accordingly, the drive system 10 of this embodiment, includes shore power connections 15A and 15B, generators 20A and 20B being driven by diesel engines 9A and 9B (not shown in FIG. 2 but shown in FIG. 3), respectively, an optional AC bus 18 made up of an AC bus 18A and an AC bus 18B interconnected through a circuit breaker 19 (1600AF), rectifiers 25A and 25B, battery banks 30A and 30B, two DC bus 40A and a DC bus 40B interconnected via a switch 42 (3150 DC).

A first DC/DC converter 41A and a second DC/DC converter 41B are used.

Each DC/DC converter is in communication with a DC bus, namely DC/DC converter 41A communicates with DC Bus 40A, DC/DC converter 41B communicates with DC Bus 40B.

First energy storage system 30A can have at least one storage unit. The first energy storage system 30A is in bi-directional communication with the first DC/DC converter 41A. If there are 10 energy storage units in the energy storage system, there are 10 DC/DC converters, one connected to each storage unit.

Second energy storage system 30B can have at least one storage unit. The second energy storage system 30B is in bi-directional communication with the second DC/DC converter 41B. If there are 30 energy storage units in the second energy storage system, there will be 30 DC/DC converters needed, one DC/DC converted connected to each storage unit Each DC/DC converter 41A and 41B selectively controls bidirectional charging and discharging of each energy storage system. In embodiments, each DC/DC converter provides isolation of the energy storage system from the DC bus when the energy storage system. Not all DC/DC converters will charge and discharge have to simultaneously, there can be selective charging and discharging of different DC/Dc converters.

In embodiments, 2 to 10 DC bus can be used per energy storage system.

The drive system includes inverters 50A and 50B, inverter 52, inverters 54A and 54B, inverters 56A and 56B, motor control centers 60A and 60B, winch motor 62, steering motors 64A and 64B, thruster motors 66A and 66B, choppers 58A and 58B, grid resistors 68A and 68B, and fire pump motors 72A and 72B.

A DC/DC converter is for managing bidirectional control of the energy into and out of the energy storage system.

The energy storage system with at least one storage unit is in bi-directional communication with the DC bus and the DC/DC converter.

An AC bus 18A is connected to generator 20A and shore power connection 15A to receive electrical power therefrom. AC bus 18B is connected to generator 20B and shore power connection 15B to receive electrical power therefrom. Connections are provided as shown for generators 20A and 20BA to be connected to each other or to shore power connections 15A and 15B.

A circuit breaker 76A (600AF) and a circuit breaker 78B (3200AF) are provided between AC bus 18A and in this example only, shore power connection 15A and AC bus 18A and generator 20A, respectively. Similarly, a circuit breaker 76B (600AF) and a circuit breaker 78B (3200AF) are provided between AC bus 18B and shore power connection 15B and AC bus 18B and generator 20B, respectively.

Fire pump motors 72A and 72B are connected to receive electrical power directly from generators 20A and 20B, respectively, via AC bus 18A and AC bus 18B, respectively, when activated. Circuit breakers 82A and 82B (1600 AF each) are provided before fire pump motors 72A and 72B, respectively. Shore power connections 15A and 15B can also be connected to AC bus 18A and AC bus 18B, respectively, at the generator outputs so that shore power can run fire pump motors 72A and 72B.

Generators 20A and 20B provide 460-690 VAC (but can be higher depending upon application, such as 4160 VAC), 45-60 Hz power and are normally connected individually to rectifiers 25A and 25B, respectively, when generators 20A and 20B are active. Generators 20A and 20B may be connected to each other or shore power, if synchronized. Rectifiers 25A and 25B convert alternating current ("AC") from AC bus 18A and AC bus 18B, respectively, to direct current ("DC") which is supplied to DC bus 40A and DC bus 40B, respectively. Circuit breakers 84A and 84B (3200 AF each) are provided before rectifiers 25A and 25B, respectively.

The DC voltage from the rectifiers is used by batteries and motor loads, as described hereinafter. The DC voltage in DC bus 40A and DC bus 40B is determined by the batteries in battery bank 30A and 30B and their rate of charge or discharge. The rate of charge may be controlled by adjusting the output voltage of generators 20A and 20B or by the DC/DC converters or a combination thereof.

Battery bank 30A is bi-directionally connected to DC bus 40A through DC/DC converter 41A to receive charging current from generator 20A and other sources as hereinafter described and to provide power to DC bus 40A which in turn powers DC to AC inverters 50A, 52, 54A, and 56A that drive motor control center 60A, winch motor 62, steering motor 64A and thruster motor 66A, respectively. DC bus 40A is also connected to a chopper 58A that is coupled with a grid resistor 68A.

Inverters 50A, 52, 54A and 56A are capable of handling 100% regenerated power. Such power is regenerated under certain conditions primarily by the winch when a load is dropping and the thruster when rotation is reversed. Smaller amounts of power may also be regenerated from the steering gear or from the use of the thruster in harvesting power from the current. The batteries in battery bank 30A are connected to automatically absorb regenerated power, either by displacing load current or by discharging. If the voltage in the DC bus 40A reaches a certain level, namely, about 750 volts (as adjusted for battery temperature) chopper 58A diverts the excess regenerated power to air cooled grid resistor 68A to prevent an over voltage condition.

Battery bank 30B is bi-directionally connected to DC bus 40B through DC/DC converter 41A to receive charging current from generator 20B and other sources as hereinafter described and to provide power to DC bus 40B which in turn powers DC to AC inverters 50B, 54B, and 56B that drive motor control center 60B, steering motor 64B and thruster motor 66B, respectively. DC bus 40B is also connected to a chopper 58B coupled with a grid resistor 68B.

Inverters 50B, 54B and 56B are capable of handling the regenerated power from their corresponding loads and, more particularly, the steering gear and the thruster of the starboard section. The batteries of battery bank 30B automatically absorb the regenerated power and any overloads are directed by chopper 58B to grid resistor 68B.

Normally, DC bus 40A is supplied by battery bank 30A and DC bus 40B is supplied by battery bank 30B. DC bus 40A and DC bus 40B may be connected so that, in the event one of battery banks 30A or 30B requires service or is offline, bus tie manual contactors are provided to cross feed the power from battery bank 30A to DC bus 40B or from battery bank 30B to DC bus 40A. The contactors are manually operated and have the ability to be electrically interlocked. They include auxiliary contacts to provide their status information to the overall operating system.

When operating with power provided only by the batteries, each of bus DC 40A and DC bus 40B is fed from its corresponding battery bank through DC/DC converters 41A and 41B, namely, battery bank 30A and battery bank 30B, respectively. The current limits of the AC drives are limited based upon the monitored output current of the online battery bank. The DC current output is monitored by means of 5000ADC rated Hal Effect Devices ("HEDs"). Set points are programmed into the operating software to prevent battery depletion beyond preset levels. In the event of either DC bus 40A or DC bus 40B fails, the other bus is still online due to the split DC bus system.

Motor control center 60A is also connected directly to AC bus 18A to automatically draw power directly from shore power connection 15A or from generator 20A bypassing the batteries and electronics, if needed. Similarly, motor control center 60B is connected directly to AC bus 18B to automatically draw power directly from shore power connection 15B or from generator 20B bypassing the batteries and electronics, if needed. Shore power is normally connected via shore power connections 15A and 15B to motor control centers 60A and 60B so that their loads can be operated directly, even if the batteries and inverters are out of service.

Shore power available from AC bus 18A and AC bus 18B can also be used to charge batteries of battery banks 30A and 30B, respectively, through inverters 50A and 50B, respectively. DC/DC converters 41A and 41B provide exact control of the battery bank boosting the input line voltage to the higher level needed to fully charge or equalize the batteries.

FIG. 2 shows a plurality of voltage sensors 202A and 202B for scaled voltage feedback of the monitored energy storage units or systems when one or more storage units of an energy storage system or one of the energy storage systems voltage is reduced below preset level and a plurality of temperature sensors 204A, and 204B for determining temperature of the energy storage units.

Figure 3:
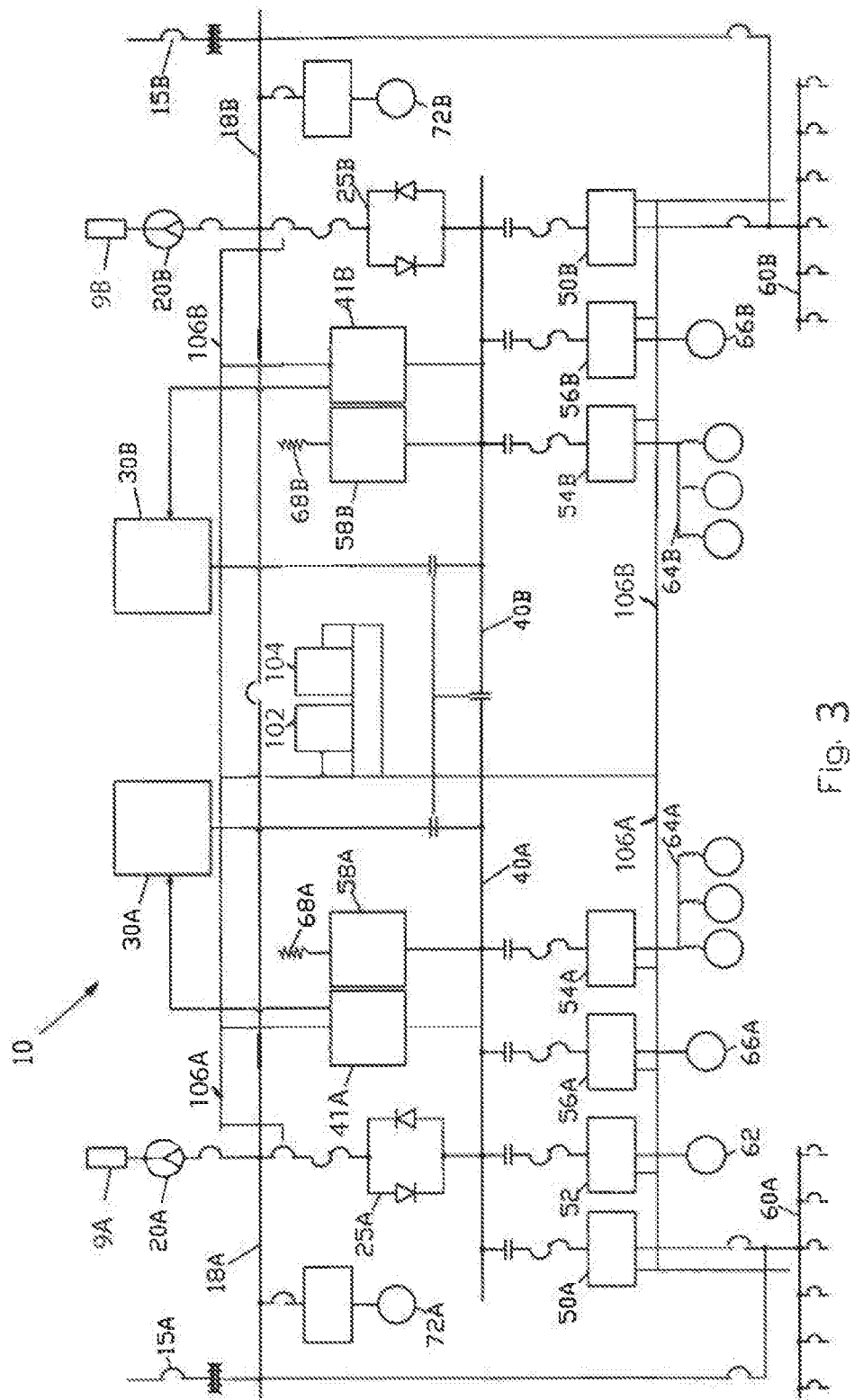
FIG. 3 depicts a detailed schematic of the functional systems shown in FIG. 1.

Referring now to FIG. 3 there is shown a more detailed schematic of drive system 10 of FIG. 2.

FIG. 3 includes the previously described components of FIG. 2, namely, shore power connections 15A and 15B, generators 20A and 20B, AC bus 18A and AC bus 18B, rectifiers 25A and 25B, battery banks 30A and 30B, DC bus 40A and a DC bus 40B, DC/DC converter 41A and DC/DC converter 41B, inverters 50A and 50B, inverter 52, inverters 54A and 54B, inverters 56A and 56B, motor control centers 60A and 60B, winch motor 62, steering motors 64A and 64B, thruster motors 66A and 66B, choppers 58A and 58B, grid resistors 68A and 68B, and fire pump motors 72A and 72B. Furthermore, there is shown a diesel engine 9A that drives generator 20A and a diesel engine 19B that drives generator 20B.

The control system is comprised of two redundant systems, a pilot house controller 102 and a drive space controller 104. Both pilot house controller 102 and drive space controller 104 are capable of complete system control and monitoring independent of each other. Each of pilot house controller 102 and drive space controller 104 has a system control software that resides in a marine rated shock proof housing chassis with a real time operating system.

The controller chassis is configured with dual independent network 106A and 106B that provide separate control of the port and starboard communication networks, respectively. Networks 106A and 106B are conduits of commands and data with local subsystems.

The engine and generator controls are uniquely designed to vary the AC voltage and the frequency as the DC bus is not adversely affected by these changes. This operating system allows for greater utilization of the power input from the diesel engine generator sets by allowing the engine to ramp down the RPM in low power applications keeping the engine within optimal fuel efficiency conditions as the power system is not solely dependent upon fixed frequency or fixed voltage.

The generator excitation output is strictly controlled and allows for the generator output voltage to be increased or decreased as needed for rapid charging rates and battery output current regulation at different rates of charge.

The engine RPM is strictly controlled and, when needed, allows for the engine RPM to fluctuate, and thus the generator output frequency to vary resulting in maximizing the efficiency of the diesel engine when loads are beneath the 80% threshold of operation.

Referring now to both FIGS. 2 and 3, battery banks 30A and 30B are unique and can be similar units, batteries of differing chemistries or combination of battery-capacitors each bank consisting of 320 individual 2-volt batteries connected in series, series-parallel, or parallel as needed. The DC voltage can be lower than that of the DC bus. The batteries are connected together via copper bus connections. The cells are rated for 3250 ADC of short time current flow.

Each individual battery weighs 268 lbs. The total weight of each battery bank 30A and 30B is approximately 85,760 lbs. with an additional 865 lbs. for the battery mounting support system.

Batteries that may be used in battery banks 30A and 30B in accordance with the present invention are batteries manufactured by Spear, XALT, LG-Chem, Corvus, Siemens, Toshiba, Maxwell or other. Other similar batteries may be used to form battery banks 30A and 30B.

Battery banks 30A and 30B are suitably connected to be charged by generators 20A and 20B, respectively. Bypasses are also provided to have battery bank 30A charged by generator 20B and battery bank 30B charged by generator 20A. During operation on battery power, if the battery charge drops below a preset level, diesel engines 10A and 10B automatically start and provide power to the battery charging system and assist in powering the vessel. Further, appropriate connections are provided to connect to and charge battery banks 30A and 30B by dockside power sources through shore power connections 15A and 15B when the vessel is at the dock.

Battery banks 30A and 30B are suitably designed to be charged in both float and fast charge methods from shore power or via the generators while underway or by regenerative power when available to be stored.

Still referring to FIG. 3, a DC/DC converter 41A is connected to DC bus 40A to receive current for charging battery bank 30A and a DC/DC converter 41B is connected to DC bus 40B to receive current for charging battery bank 30B. DC/DC converters 40A and 40B are active continuously monitoring the state of charge of the battery banks 30A and 30B. Generators 20A and 20B are configured to charge battery banks 30A and 30B or provide additional power as needed, as described below. When the power management system (PMS) determines battery bank 30A or 30B has crossed the preset threshold of charge, generator 20A or generator 20B is started and brought online. After the completion of a bus 40A or bus 40B active front end to supply power to the corresponding DC bus and relieve the current load from the corresponding battery bank 30A or 30B has been confirmed, the PMS issues commands to DC converter 41A or 41B to begin charging battery banks 30A or 30B. The DC/DC converters 41A and 41B are deployed one per battery group thus in a configuration to enable charge/discharge of individual groups of batteries within the battery bank as a whole.

The charging system for each battery bank 30A or 30B is designed in separate charging groups, each group being charged at a time with a dedicated DC/DC converter. When the propulsion system is active, the battery charging system is rotated between the groups at intervals determined by the state of charge of each individual battery group.

The charging requirement for the battery type is based upon voltage per cell (constant voltage). The specific minimum and maximum levels of voltage amplitude and current flow for rates of charge are programmed into the DC/DC converters 41A and 41B using the battery manufacture's recommended guidelines.

The hardware for DC/DC converters 41A and 41B charging the batteries are bi-directional inverters that electrically isolate the battery from the DC bus and have the ability to increase or decrease the voltage to/from the battery while maintaining strict regulation of the current. Alternately, a full wave diode bridge can be used with charging currents regulated by variance of both the generator voltage output and the engine revolutions per minute (RPM). As the vessel's service loads are supplied power through an AC inverter assembly, these variations do not affect the vessel's service loads.

Still referring to FIG. 3, battery monitors monitor battery banks 30A and 30B, respectively. Battery banks 30A and 30B are monitored by incorporating voltage sensors that provide a scaled voltage feedback of the monitored batteries when the voltage is reduced below preset levels. The monitoring system uses the prescribed method as provided by the battery manufacturer to determine the lowest battery in each individual battery bank. Battery monitors identify potential problems early by tracking the voltage and temperature of each cell.

Battery monitors consist of cell monitors that measure the voltage and temperature of individual battery cells, and a master unit that reads the cell monitors and communicates with the system controller over network communications. The master unit also reads the full cell voltage, battery current sensors, and local ambient temperature. An algorithm of the data may be run to determine the condition of battery bank 30A and 30B and to place limits upon the current draw allowed.

Although the system may be operated by monitoring any number of cells from 1 to 1000, such as 320. In an embodiment, all 1000 cells on each of battery banks 30A and 30B can be monitored individually. In embodiments, every cell is monitored and data for every cell can be used to optimize battery performance and life. Each battery monitor reads the cell voltage and local temperature, digitizes and galvanically isolates the data, and connects to a daisy chained serial data network connecting back to the power management system (PMS).

No individual battery cell shall be allowed depletion past 30%, thus extending the maximum power of the system delivery to the propulsion units. If a battery draws down to or below the 50% level, generator 20A or 20B assigned to that bus starts automatically, closes onto the main bus and relieves the current draw from the battery bank and provides charging current to the battery bank at the same time interval. The battery bank charge levels are indicated on the HMI displays located in the drive space and the pilot control.

Drive system 10 is built around battery banks 30A and 30B that serve as the backbone of the system. The selection of the battery operating voltage drives the selection of the motors, generators, and drive modules. A typical operating voltage is based upon a 480 volt system. Other systems, however, with lower or higher voltages may be used in accordance with the present invention. If the loads and sources are not selected to be directly compatible with the battery voltage, then additional power conversion will be required, imposing cost, size and efficiency penalties. Therefore, system design is based upon the loads and coordinated with the battery supply to formulate a coordinated operating system that is both cost effective and workable.

The following is the load voltage calculation for a 480 VAC system. The nominal battery voltage of the Spear SMAR-6N battery used is 44.4 VDC at 1500 ADC max discharge current. In this embodiment, 10 SMAR-6N's are connected in series for 444 VDC. The minimum DC voltage needed to make AC voltage is the peak to peak voltage times the square root of two, namely:

480 VAC*1.414=>679 VDC

440 VAC*1.414=>622 VDC

With 444 volts input a suitably designed electronic inverter cannot produce the 480 VAC to the propulsion motor with only a 444 VDC input from the battery bank. The DC/DC converters 41A and 41B have the ability to increase the DC voltage from the battery banks 30A and 30B to match that of the DC bus 40A and 40B. Therefore, with the capability of the DC/DC converters to match DC voltage on either side the system as deployed has increased optimal operation as minor variances of the voltages do not adversely affect the battery banks or the either DC bus.

The following is the line voltage calculation. The SMAR-6N battery charging voltage is 492 DC volts (49.2-V/cell), @ 450 DC amps under fast charge conditions. As the DC/DC converter has the ability to increase or decrease the voltage on either side of the converter (battery banks 30A-30B or DC bus 40A and DC bus 40B) the strict voltage regulation of the system as seen with other systems is eliminated thus providing a power system more easily strictly controlled within exact parameters needed for long term trouble free operation.

By these calculations, under load a 480 volt source will closely match the nominal battery voltage, under any operational circumstances when the state of charge is maintained within the manufacture's recommended guidelines.

The level of boost is readily provided by inverters 50A and 50B run with reverse power flow, so that those inverters can serve double duty as battery chargers when operating from shore power through shore power connections 15A and 15B.

Diesel engines 10A and 10B are similar units, each having a minimum KW rating of 1800 KW. Diesel engines 10A and 10B are suitably designed to meet and/or exceed EPA Tier mandated emissions throughout the range of loaded conditions. Diesel engines 10A and 10B are suitably rated to marine use as stipulated by the American Bureau of Shipping ("ABS") requirements and suitably designed to utilize marine heat exchangers for the primary method of cooling. Diesel fuel requirement is standard and thus, diesel engines 10A and 10B can be fueled at any standard supplier of diesel fuels along the coastal waterways.

Diesel engines 10A and 10B have local engine monitoring functions complete with electronic capability to communicate with the vessel Power Management System ("PMS") via serial connection.

Diesel engines 10A and 10B provide mechanical power to rotate generators 20A and 20B, respectively, at a set speed. Generators 20A and 20B convert the mechanical energy into electrical energy usable by the vessels systems.

Generators 20A and 20B which are similar units are suitable designed for 460-690 VAC, 2500 kVA, 45-60 Hz electrical requirements. They have winding and bearing temperature monitoring devices to satisfy American Bureau of Shipping ("ABS") marine propulsion power system requirement. These devices are 100 ohm platinum RTD's.

Any commercially available diesel engines and generators meeting the stated specifications may be used as diesel engines 10A and 10B and generators 20A and 20B. A preferred diesel engine/generator package is the Marine Caterpillar Model 3516 DITA Direct Injection Turbocharged which is after cooled with a separate circuit after cooling. The preferred generator 20A and 20B is a Kato or equivalent 480 VAC, 60 Hz generator. This offshore electric diesel engine/generator with a rating of 1825 KW @ 1800 RPM includes the following standard attachments:

Air Inlet System (after cooler core (corrosion resistant), air cleaner (regular duty with soot filter), service indicators)

Control System (Caterpillar ADEM Electronic Engine Control (left hand), requires 24V DC 10 Amp continuous, 20 AMP intermittent, clean electrical power).

Heat Exchanger Cooled Marine (Outlet controlled thermostat and housing, jacket water pump gear driven, single outlet with tubed heat exchanger, gear driven centrifugal after cooler fresh water cooling pump (SCAC), SCAC pump circuit contains a thermostat to keep the after cooler coolant from falling below 30 deg C. (85 F)).

Exhaust System (standard stroke exhaust fittings (flexible 203 mm (8 in)), standard stroke exhaust flange (welded 356 mm (14 in), dry gas tight exhaust manifolds with thermo-laminated heat shields, dual turbochargers and thermo-laminated heat shields).

Flywheels and Flywheel Housings (flywheel (SAE No. 00 with 183 teeth), flywheel housing (SAE No. 00), SAE standard rotation).

Fuel System (fuel filter (left hand), fuel transfer pump, flexible fuel lines, fuel priming pump (left hand), electronically controlled unit injectors).

Instrumentation (electronic instrument panel (left hand); analog gauges with digital display data for engine oil pressure gauge, engine water temperature gauge, fuel pressure gauge, system DC voltage gauge, air inlet restriction gauge, exhaust temperature (prior to turbochargers) gauge, fuel filter differential pressure gauge, oil filter differential pressure gauge, service meter (digital display only), tachometer (digital display only), instantaneous fuel consumption (digital display only), total fuel consumed (digital display only), and engine start-stop (off, auto start, manual start, cool down timer))

Lube System (crankcase breather, oil cooler, oil filter (left hand), deep oil pan, oil pan drain valve (2" NPT female connection), lubricating oil (SAE 10W30, Caterpillar DEO (CG4) 813 L)).

Mounting System (rails, mounting, floor type, 254 mm (10 in)).

Power Take-offs (accessory drives, upper right hand, lower left hand Front (available for PTO usage), front housing (two-sided)).

Starting System (air pre lube pump, air starting motor (right hand, 620 to 1034 kPa (90 to 150 psi), left hand control), air silencer).

General (paint (caterpillar yellow), vibration damper and guard, lifting eyes).

Fuel Cooler. One Young Touchstone Remote vertical fuel cooler with horizontal discharge is installed. Radiator is sized to cool up to five 3516B engines manifolded together or standard marine heat exchangers may be used as room permits. It Includes Heresite coated core and hot dipped galvanized steel parts, 5 HP TEXP motor (3 ph/230/460 volt) and core and fan guards.

Protection System. ADEM or any other equivalent monitoring system provides engine de-ration, alarm, or shutdown strategies to protect against adverse operating conditions. Selected parameters are customer programmable. Status available on engine mounted instrument panel and can be broadcast through the optional customer communications module or programmable relay control modules(s)). Initially it is set as follows:

Safety Shutoff Protection, Electrical (oil pressure, water temperature, overspeed, crankcase pressure, after cooler temperature; includes air inlet shutoff, activated on overspend or emergency stop).

Alarms, Electrical alarms can be (ECM voltage, oil pressure, water temperature (low and high), overspend, crankcase pressure, after cooler temperature low water level (sensor is optional attachment), air inlet restriction, exhaust stack temperature, filter differential pressure (oil and fuel)).

Derate, electrical can be (high water temperature, crankcase pressure, after cooler temperature, air inlet restriction, altitude, exhaust temperature; emergency stop push button, located on instrument panel; alarm switches (oil pressure and water temperature), for connection to alarm panel).

Each diesel engine 10A/generator 20A set and diesel engine 10A/generator 20B set includes a control cubicle for load sharing control. Each control cubicle includes the following: 3200 amp rack out main breaker with LSI adjustable trip, under voltage trip and trip indicator; 3×4500:5 current transformers; 1 load sharing speed control unit for active KW and KVAR load sharing control of the engine and generator set (controller includes protections for under voltage, over voltage, over frequency, under frequency and reverse power; AC module control transformer; sync control transformer and Auto Sync controls; excitation power transformer; engine OFF/IDLE/RUN switch; generator sync selector switch; interlocked breaker close push button; digital screen display power management meter for display of 3 phase voltage, 3 phase amperage, frequency, Kilowatts, Kilovars, bus harmonics and voltage fluctuation and record trending of up to 3 years accumulative engine/generator load and fault data; RTD generator temperature display for winding 1, winding 2, winding 3, drive bearing and tail bearing; power limit interface with AC drives and battery demand monitor; hour meter indicating hours online; generator run light; generator online light; emergency shutdown interface relay; generator heater relay; no touch control fuses; marine nonconductive handrails; marine drip shield IP20; engine/generator field connection terminal block; AC Bus ground fault indication Still referring to FIGS. 2 and 3, each of inverters 50A, 50B, 52, 54A, 54B, 56A and 56 B and choppers 58A and 58B consist of a plurality of modules, preferably, Tera-Torq™ Inverter Modules (TIM-200) or equivalent manufacture. Each module can drive 300 HP and can be configured in real-time for a number of different modes of operation. The TIM-200 modules are 28 inches deep 6 inches wide and 13 inches high. All of the high power connections are blind-mate connectors in the back so the modules can be replaced without handling dangerous bus voltages. A TIM-200 module has blind mate power connections, AC & DC fuses, IGBT switches, 32 Bit DSP controls and liquid cooling connections. Blind mate power connections are suitable for removing and replacing a particular module without touching the power conductors. AC & DC fuses are included in every power lead whereby any problem that may occur in a particular module is isolated in the particular module without affecting the other modules. The IGBT switches are 1700 volt switches that provide sufficient margin for unexpected events. The 32 bit DSP controls is a built in 32 bit 150 MHz digital signal processor that enables a particular module to respond instantly and correctly to changing voltages, currents and temperatures. Liquid cooling connections provide for the flow of high performance heat sink liquid that removes heat form the IGBT switches of the module. Each module has digital status readout.

A plurality of modules is inserted in a cabinet with the cooling and communication bus connections allowing for the easy access, removal and insertion of each module.

Still referring to FIGS. 2 and 3, each of inverters 50A and 50B has 2 TIM-200, or equivalent, drive modules (4 modules total) and provide 60 Hz 440 VAC power for distribution through a motor control center. The power is 250 kW and the current is 400 A. Inverters 50A and 50B are also back driven to provide DC power for battery charging when on shore power.

Inverter 52 has 1 TIM-200, or equivalent module and provides four-quadrant variable speed control to a 150 kW induction motor, voltage 440 VAC and current 200 A. Other inverters may be used as long as special modifications are made to the firmware to ensure that the DC bus voltage can be operated at a large differential (200 vdc-1000 vdc) without faulting.

Each of inverters 54A and 54B has 1 TIM-200 module or equivalent, (2 modules total) and provides four-quadrant variable speed control to induction motors totaling 100 kW, current 150 A and 440 VAC.

Still referring to FIGS. 2 and 3, inverters 54A and 54B have 15 TIM-200 modules, or equivalent, each. They each provide four-quadrant variable speed control to a 2500 kW induction motor, current 3000 A, 440 VAC.

Each of choppers 58A and 58B (600 kW, 800 A, 750 VDC, 2 TIM-200 modules, or equivalent, each) handle excess electric power from the thrusters and winch when they regenerate power. Each of choppers 58A and 58B sends any unusable electric power to external load resistors 68A and 68B, respectively, to be dissipated.

Drive system 10 includes two drive cabinets (one for the port section and the other for the starboard section). Drive cabinet contains the coolant, control, and power connections for the system. It is arranged as a grid, with each the modules for each subsystem typically installed side by side on a single row, or multiple rows for higher power devices. Each of the two cabinets requires 55 gallons per minute of liquid coolant (110 GPM total).

Referring now to FIG. 2, AC bus 18A and AC bus 18B is assembled as a singular bus system and it supplies power to battery charging systems 92A and 92B, fire pump motors 72A and 72 b and the charging systems of DC Bus 18A and DC bus 18B.

All power breakers connected to AC bus 18A and AC bus 18B have the capability for remote closure and remote disconnect. The status of the breaker is also monitored by the PMS automation and provides operating status and interlock functionality.

The main bus and marine switchgear is designed with the following standards: main bus rating of 5500 amps for ac bus distribution; bus fault rating is 100 KIA @ 480 VAC; main bus is plated copper; main bus hardware is stainless grade 8 hardware Switchgear construction is welded steel frame with 12 gauge hinged doors; all cubicles requiring forced air ventilation have louvered vents with filtered suction; all breakers are rack out marine type as per requirement; all breakers have network communications capability; all breakers with ratings greater than 600 amps supplied with auto charging controls for stored energy devices and remoter close solenoids; shore power breaker is interlocked with the generator breakers; status of main bus and interlock condition is indicated by visual indicator (light); all breaker nomenclature to include breaker setting information, load or source information and component reference id; local and remote ground fault indications; nonconductive hand rails as per abs requirement; drip shields as per ABS requirement; paint requirement is ASA 61 Polane B or equivalent coating system; and a 15 inch color touch screen centrally located in the switchgear for ease of monitoring system status and/or alarm conditions; generator temperature resistive thermal device are tied into power management system alarm system with set points as per manufacture specifications; engine generator control system has auto/off/manual mode selection for maintenance purposes; fire pump controls to include soft start system to reduce magnetizing current throughput when starting motors. Soft starters are complete with bypass contactors; and all status indication lights located on front doors are 24 volt with exception of generator status lights on generator control cubicle doors.

Still referring to FIG. 2, circuit breakers 76A and 76B are Siemens WL1000AF, rack out marine use (or equivalent); 600A rating plug, LSI electronic trip unit; 120 VAC motor charging unit; 120 VAC remote close coil; 120 VAC under voltage trip unit, network communications option; 3 sets NO contacts; 3 sets NC contacts.

Circuit breakers 78A and 78B are Siemens WL3200AF, rack out marine use (or equivalent); 3200A rating plug, LSI adjustable electronic trip unit; 120 VAC motor charging unit; 120 VAC remote close coil; 120 VAC under voltage trip unit, network communications option; 3 sets NO contacts; 3 sets NC contacts.

Circuit breakers 82A and 82B are Siemens WL1600AF, rack out marine use (or equivalent); 1600A rating plug, LSI adjustable electronic trip unit; 120 VAC motor charging unit; 120 VAC remote close coil; 120 VAC under voltage trip unit, network communications option; 3 sets NO contacts; 3 sets NC contacts.

Circuit breakers 84A and 84B are Siemens WL3200AF, rack out marine use (or equivalent); 2500A rating plug, LSI adjustable electronic trip unit; 120 VAC motor charging unit; 120 VAC remote close coil; 120 VAC under voltage trip unit, network communications option; 3 sets NO contacts; 3 sets NC contacts.

Referring now to FIG. 3, breakers 98A and 98 b for charging systems 92A and 92B are shown. Breakers 98A and 98B are Siemens WL1000AF, rack out marine use (or equivalent); 1000 A rating plug, LSI adjustable electronic trip unit; 120 VAC motor charging unit; 120 VAC remote close coil; 120 VAC under voltage trip unit, network communications option; 3 sets NO contacts; 3 sets NC contacts.

Figure 4:
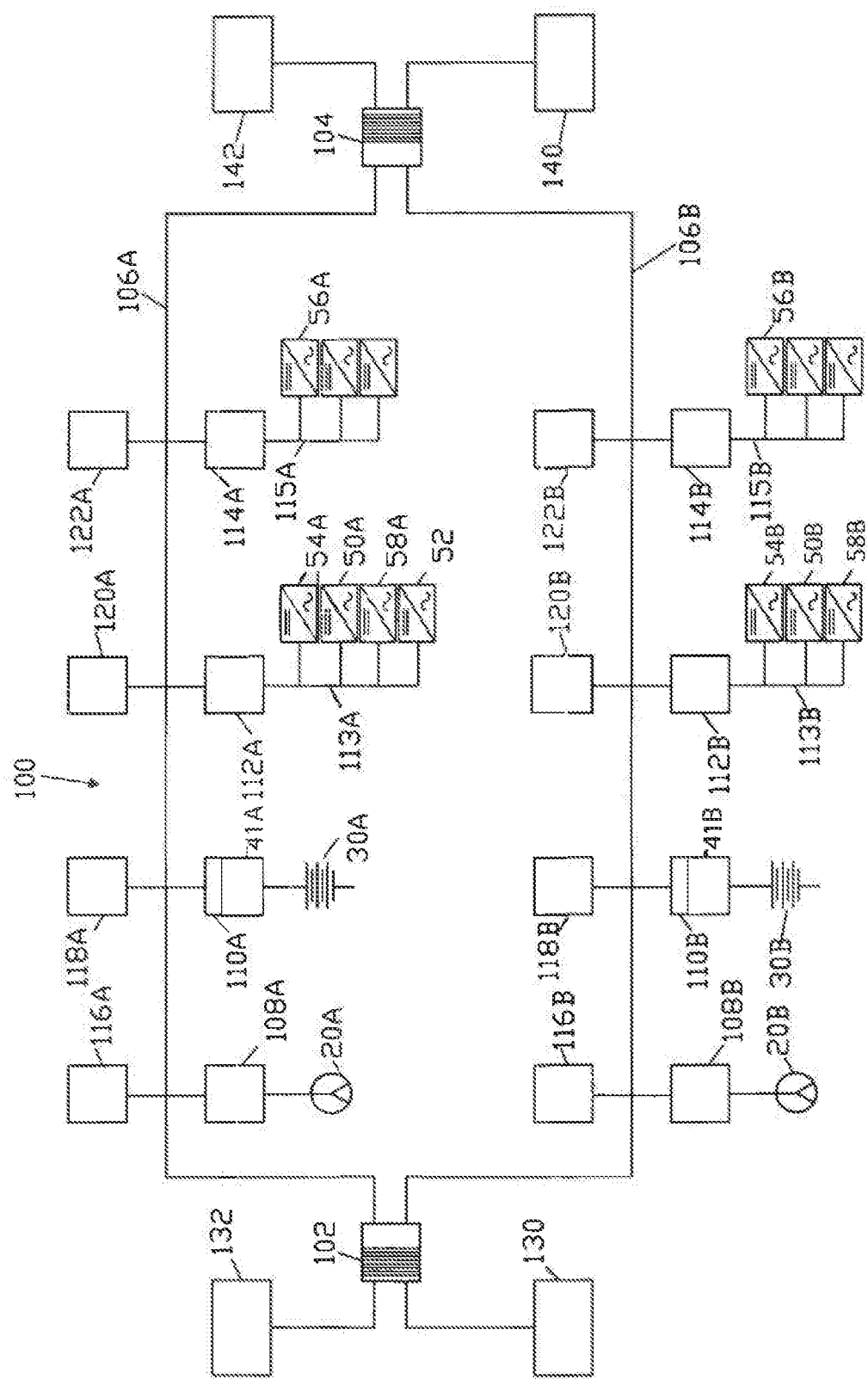
FIG. 4 depicts a schematic illustrating the controls of the drive system of FIG. 2.

Referring now to FIG. 4, there is shown system control 100 for the buoyant vessel with controlling and monitoring drive system 10.

Control system 100 is formed of two redundant systems, a pilot house controller 102 and a drive space controller 104. Both pilot house controller 102 and drive space controller 104 are capable of complete system control and monitoring independent of each other. Each of pilot house controller 102 and drive space controller 104 has a system control software that resides in a marine rated shock proof housing chassis with a real time operating system.

The controller chassis is configured with dual independent network 106A and 106B that provide separate control of the port and starboard communication networks, respectively. Network 106A is the conduit of commands and data with local subsystems in the port communications network including a controller 108A for generator 20A, a monitor 110A for battery bank 30A, DC/DC converter 41A, a first controller 112A for a first subsystem 113A for inverters 50A, 52, 54A and chopper 58A, a second controller 114A for a second subsystem 115A for inverter 56A, a circuit breaker 116A, a first motor starter 118A, a circuit breaker 120A and a second motor starter 122A. Some of the subsystems are simple monitors that only report data (for example the battery voltage monitors and circuit breaker status monitors). Other subsystems receive and execute commands as well as reporting data (for example the motor controllers and the generator controls). The inverter drive subsystems have an additional level of control network. Commands and data are exchanged with the system controller over the network, and the local controller coordinates the operation of inverter modules.

Similarly, network 106B is the conduit of commands and data with local subsystems in the starboard communications network including a controller 108B for generator 20B, a monitor 110B for battery bank 30B, DC/DC converter 41B, a controller 112B for a subsystem 113B for inverters 50B, 54B and chopper 58B, a controller 114B for a subsystem 115B for inverter 56B, a circuit breaker 116B, a motor starter 118B, a circuit breaker 120B and a motor starter 122B. Like in the port network, some of the subsystems of the starboard network are simple monitors that only report data (for example the battery voltage monitors and circuit breaker status monitors). Other subsystems receive and execute commands as well as reporting data (for example the motor controllers and the generator controls). The inverter drive subsystems have an additional level of control network. Commands and data are exchanged with the system controller over the network, and the local controller coordinates the operation of inverter modules.

For the buoyant vessel, control system 100 provides reliable and responsive operation of all of the elements of the power system through a simple and redundant operator interface. Primary control is performed from the pilot house where pilot house controller 102 is controller using pilot house manual controls 130, such as switches, knobs, levers, and joysticks, at the left edge of the diagram. Clear visual feedback of propeller speed can be provided on two dial gauges. Pilot house manual controls 130 are supplemented by a touch screen computer display 132. Touch screen computer display 132 provides detailed operating status information. A graphical user interface lets the operator select the data to be displayed, change operating modes and limits, and acknowledge status messages. The underlying philosophy is that time-critical and frequently used controls have dedicated manual inputs, and the rest are accessed through the touch screen.

The buoyant vessel has pilot house manual controls 130 and pilot house touch screen monitor 132 are connected to pilot house control 102, which is a modular controller chassis running a real time operating system. This unit contains the control and interlock programming that coordinates system operation. It communicates with the power system components over the two separate networks 106A and 106B.

The redundant set of controls drive space 104 is located in the drive space of the vessel and is connected to drive space manual controls 140 similar to pilot house manual control 130 and drive space touch screen monitor 142 similar to pilot house touch screen monitor 132. Drive space controller 104 provides local monitoring and display of system status, but only exerts control if assigned by the pilot house or if pilot house controller 102 is offline. This architecture provides a high degree of protection because each of the independent communication networks can be independently controlled by two physically separate control stations.

In a typical configuration, the control system and hardware configuration has the safety features designed into the system. The safety functions are broken into specific hardware and/or operating function groups. Examples of such safety functions include the following:

| SAFETY FUNCTION | ACTION |
| --- | --- |
| Reverse Power | Trip Breaker-Engine Shut down |
| Over Speed | Trip Breaker-Engine Shut down |
| Under Voltage | Trip Breaker |
| Over Voltage | Trip Breaker |
| Generator Over Temp | Alarm |
| Synchronization Check | Breaker Closure Control Permissive |
| Ground Fault | Alarm |
| DC Bus 40A Fault | Alarm - Shutdown |
| DC Bus 40B Fault | Alarm - Shutdown |
| Charging Unit 92A Fault | Alarm - Reduction output Battery Bank 30A |
| Charging Unit 92bB Fault | Alarm - Reduction output Battery Bank B |
| Propulsion Motor Overtemp | Alarm - Shut Propulsion Motor |

The control system and hardware configuration of drive system 10 has several interlock functions suitable for the operation of drive system 10. Such interlock functions include the following:

Shore Power Breaker interlocked with Energized Bus Sensor. Shore Power Breaker cannot be closed with AC Bus 18 energized or Generator 20A or Generator 20B breaker closed.

Battery Banks 20A and 20B—Tie manual DC contactor switches. Logic statement is as follows;

A=1, B=1, T=0
A=0, B=1, T=0 OR 1
A=1, B=0, T=0 OR 1

Battery fault 30A or 30B shutdown of DC/DC converter 41A or 41B protective function.

Fire Pumps Disabled unless FIRE FIGHTING Mode selected.

Main Propulsion Drives not enabled unless permissive received from aux function enable circuit (Thrustmaster System or Equivalent).

AC/DC Converters 25A & 25B cannot be enabled if DC Bus 40 fault exists.

Port MCC drive feed interlocked with backup 480 VAC Bus feed breaker. Normal operation is from AC drive inverter supply. Back emergency failure mode is fed from 480-volt bus.

Starboard MCC drive feed interlocked with backup 480 VAC Bus feed breaker. Normal operation is from AC drive inverter supply. Back emergency failure mode is fed from 480-volt bus.

Drive system 10 and the vessel utilizing drive system 10 are appropriately designed to operate in three different modes, namely, the green mode, the tow mode and the firefighting mode. Green mode is the default mode of operation. The operator can select either tow mode or firefighting mode to override some of the automatic power management functions of the control system.

In the green mode the vessel is supplied power only by the batteries in battery banks 30A and 30B without utilizing the diesel engines for ship propulsion and/or ship service.

Control system 100 energizes diesel engines 10A and 10B and generators only when needed to provide peak power or battery charging. The batteries in battery banks 30A and 30B hold enough energy to sustain 300 Hp of incidental loads for over 8 hours between charges; however battery life is increased if more shallow discharge cycles are used. Generators 20A and 20B come on line automatically based on a combination of the load and the battery state of charge. In the green mode, the minimal use of diesel engines cause substantial reduction in noise level, energy consumption and carbon emissions. Green mode is designed for operating the tugboat between locations when it is not towing another vessel and for dockside operations.

The tow mode may be manually selected by the operator. Selecting tow mode energizes diesel engines 10A and 10B and generators 20A and 20B so that they will be available immediately to support peak power demands. The voltage from generators 20A and 20B maintains a float charge on battery banks 30A and 30B except at very heavy loads, where power is drawn from battery banks 30A and 30B to supplement generators 20A and 20B.

The firefighting mode may be manually selected by the operator. Firefighting mode energizes both diesel engines 10A and 10B and generators 20A and 20B, and gives priority to the fire pumps that are driven by fire pump motors 72A and 72B. The power available to nonessential systems is limited in this mode. The fire pumps receive AC power directly from generators 20A and 20B, and are not dependent on battery banks 30A and 30B or power conversion electronics.

The drive system operating modes differ in the sources of power and the path that the power takes to the load. Each of the vessel operating modes may include several different drive operating modes. In normal operation the control system automatically selects the drive system operating mode; however in some cases the operator may directly select the operating mode for maintenance or emergency conditions. For example, the maintenance schedule might call for battery equalization to be run once every six months. The port and starboard sides of the drive system may be in the same or different modes at any time.

If the vessel is in green mode, there is sufficient charge in battery banks 30A and 30 *b*, and the load is not too heavy, the drive system will run on battery power. At no load and full charge the battery voltage will be 444 volts DC. At 500 Horsepower total load the voltage will show a relatively modest droop. The system could be run under this condition for over five hours from fully charged batteries; however starting diesel engines 10A and 10B and generators 20A and 20B periodically will increase the service life of battery banks 30A and 30B by removing load (current draw) from battery banks 30A and 30B and providing charging current, which will be proportional to the overall system load.

An analysis determines the optimal generator starting scenarios. For example, at 90% state of charge the diesels might be programmed to come on at a load equal to 25% of the one-hour discharge current, and 10% current at 75% state of charge. The goal of the optimization is to minimize pollution and fuel use, while maximizing service life.

When operating from battery power there is no voltage on the AC bus 18 coming in to rectifiers 25A and 25B. All AC power for the MCCs and motor loads is synthesized from battery voltage from DC Bus 40A and DC bus 40B by the inverters. The battery state of charge is calculated by measuring the battery cell voltage, temperature, and load current using networked integrated circuit boards attached to the batteries.

When generators 20A and 20B are brought on line they feed AC power to rectifiers 25A and 25B, which in turn provide DC power to battery banks 30A and 30B and inverters. If the AC voltage is low the rectifier output will be too low to feed power into DC bus 40, and the system will continue to run from battery power. As the AC voltage is increased, the rectifier will start to take load off of the batteries, causing the battery terminal voltage to increase. If the AC voltage is increased further, the rectifier will provide all of the load current to the inverters and will also provide current to recharge the batteries. The power output of the generators and the charging rate of the batteries can be controlled by varying the DC/DC converter voltage over a fairly narrow range. This concept is unique in that the excitation level is varied due to the charging rate needed for the battery bank. The excitation has limits placed upon it so not to exceed the maximum limits of the battery manufacture recommendations.

The applied charging voltage is automatically adjusted by the DC/DC converter for battery operating temperature, and the charging current is limited to avoid excess heating. Also, over-charging must be avoided because it can lead to gas discharge or thermal runaway. For this reason, it is very important that the proper manufacture battery data be used to program the operating parameters of the DC/DC converters 41A and 41B.

As in battery power mode, when generators 20A and 20b are on, all AC voltages for the MCCs and motor loads are synthesized from DC voltage by the inverters. However, AC power from generators 20A and 20B is available to the fire pumps connected directly to the 480 volt Bus in this mode. Generators 20A and 20B can be run separately to regulate battery banks 30A and 30B independently, or the AC bus 40A and AC bus 40B can be cross connected to charge both battery banks from a single generator or a pair of synchronized generators. When operating in this mode the generator VAR sharing circuits are synchronized to provide current from the same amplitude of current from each generator.

When the vessel is connected to 480 volt shore power via shore power connections 15A and 15B, battery banks 30A and 30B can be charged and loads can be run without powering generators 20A and 20B. The preferred connection for shore power is directly into the port and starboard MCCs. With this configuration MCC loads can be run even if the drive electronics or batteries are disabled for maintenance.

Battery charge regulation is provided by inverters 50A and 50B that normally synthesize MCC power from the battery voltage. They operate as boost rectifiers to provide the proper charging voltage for battery banks 30A and 30B. At room temperature the battery voltage is regulated to 444 volts to maintain a float charge. At higher temperature the voltage is reduced.

Shore power can also be connected to AC bus 18 at the generators. This allows the fire pumps to be operated, and allows charging of battery banks 30A and 30B through rectifiers 25A and 25B. It should be noted, however, that only a low level of charge is possible through this path unless the incoming voltage exceeds 480 volts.

A variety of maintenance modes are available to deal with unusual situations. For example, bypass circuits allow the MCCs to be connected directly to the output of generators 20A and 20B, or allow the fire pumps to operate from the MCCs. Both battery banks 30A and 30B can be charged from a single generator 20A or 20B. The port and starboard inverters can be cross connected to operate from a single battery bank 30A or 30B. By providing such designs, when a failure occurs in the system, such failure causes only a partial and not a total disablement of the vessel thereby allowing the vessel to operate.

The use of the combination of battery banks 30A and 30B and generators 20A and 20B allows for reduction of use of generators 20A and 20B in certain operating modes and, more particularly, in the green mode. The battery output from battery banks 30A and 30B is connected to DC bus 40 that provides power to the AC drives which are electronically controlled and provide power to the thrusters and all ships service. The tugboat has the ability to be mobilized without the need to operate generators 20A and 20B and can operate for prolonged periods on battery power alone. Generators 20A and 20B are only used in the towing mode, fire fighting mode or when charging the batteries. As a result, fuel consumption is reduced thereby reducing fuel costs and carbon emissions from the vessel. It is estimated that carbon emissions are reduced by as much as 90 percent as compared to the previous designs of tugboats and operations.

In drive system 10, power may be drawn from generators 20A and 20B, shore power connections 15A and 15B, or battery banks 30A and 30B. Power may be drawn by large loads, such as the thrusters, steering, winch, and battery, or by smaller loads attached to the motor control centers. System efficiency is maximized by streamlining the paths among the loads and sources, and by ensuring seamless transitions as conditions change.

The control system of drive system 10 is configured to draw energy from the most efficient source. In addition the system supports re-generation to channel energy from the drive back into battery banks 30A and 30B under certain conditions as previously described.

The replacement of diesel engines and generators with battery banks 30A and 30B reduces the size of the drive line and the overall space required for it. It is estimated that the space is about 50% smaller than that required for other commercial drives.

The use of a set of identical modules TIM-200, or equivalent, allows for their replacement at sea without an electrician and results in reduction of down time and maintenance costs. Modules are automatically re-programmed for the specific application and can be swapped at sea. For example, the winch drive requires a single module while each thruster uses 15 modules. If a winch drive module fails, it can be replaced by one of the thruster modules and while the maximum thruster power would be limited slightly, the winch would be fully operational.

For the buoyant vessel, the drive system 10 is designed to comply with the design and manufacture specifications of the American Bureau of Shipping as found in the Rules for Steel Vessels 2019, and subsequent amended documents with regard to ABS manufacturing rules for steel vessels of this class with special emphasis on redundancy and emergency mode requirements.

The buoyant vessel and system is controlled by standard software that are available with the components of the system. The software is suitably programmed to control the operation as described herein.

The operating system design of the marine hybrid propulsion system allows for the buoyant vessel to make way without the need to operate any diesel engines. This is considered unique as no other system has this ability. The unique design features are described below.

The control system allows for vessel to be under way without the need for diesel engine power source to be online. This is unique to the buoyant vessel operating system from all other propulsion control systems. The result is a dramatic fuel reduction usage due to the requirement that no prime movers are needed for propulsion and ships service power, carbon emissions are inherently reduced for the same reason plus a dramatic reduction in baseline ambient noise of the vessel in operations. All three of these areas are beneficial to harbor operations for tug boats and ferries.

Battery system charge can be refreshed rapidly by precise control of engine (prime mover) RPM and generator voltage output (due to the variable excitation control system) or simply with the DC/DC converter without affecting the power output control capability of the propulsion system or the vessel service supplies. During rapid refresh the needed power output from the controlled power output devices are constant and consistent with the power needed for any specific purpose.

In any mode of operations, the hull of the buoyant vessel has inertial stored energy can be harvested with reduction of vessel speed commands and returned to the energy storage system (battery banks) by the automated electronic control system or the energy can be placed into the vessel ships service system. This structure maximizes overall power system efficiency by harvesting a ship's hull inertial energy and subsequent conversion to a usable source energy.

Power is supplied to the buoyant vessel by one of three most efficient sources as defined by the buoyant vessel's automated vessel power management system. The three (3) sources of power are: (a) Stored energy battery supply power source, which depending upon the system design is between 1.5 megawatt to 10 megawatts; (b) Diesel engine generator power source; and (c) Shore power source when connected dockside.

In the latter case, the stored energy charging system and the vessel's service power used are transferred to the most efficient source which is located at the power generation plant. Typically power generation plants are regulated thereby limiting the total amount of carbon emissions allowed per kilowatt hour of power generated.

Battery storage and power delivery system is managed on a "per cell" and a "per group" basis. This energy storage allows for very efficient power management into and out of the battery energy storage system.

The buoyant vessel control system is designed with a green mode of vessel operations unique to the system operating system design. As previously stated, this invention allows the buoyant vessel to make way (propulsion systems and ships service systems active) without the need to have diesel engines operating, resulting in reduced carbon fuel consumption and the resultant reduced carbon emissions.

The green mode of operations also allows for reduced sound decibel levels during operations, which benefits local populations and the personnel operating the buoyant vessel onboard.

The power draw from the energy storage system is electronically monitored and controlled by the unique control system design in the following method and results: (a) the stored energy is calculated and the energy drawdown is electronically controlled based upon the total available energy calculation of the stored energy battery system; (b) the AC propulsion drive current limits are continuously monitored and adjusted and so the propulsion system efficiency is considered during operation to maximize total system efficiency. This is seamless to the vessel operator and comparable to the fly by wire operation of air craft and modern automobiles; and (c) by slowing the buoyant vessel down during green mode the energy from the buoyant vessel is harvested by the permanent magnetic propulsion motors and delivered back to the energy storage system or to the ships service power system. Either way, there is a reduction of energy draw from the energy storage system thus maximizing efficiency of the overall power system.

Buoyant vessel automated power management allows for dramatic drop in DC bus voltage in emergency vessel operating conditions. These conditions are defined as the vessel being underway and the use of diesel engine power generating plants are lost (for whatever reason, mechanical problems, loss of fuel supply, etc.). The AC drive operating algorithms allow for a wide range of DC bus fluctuations which allow for large draw down in power from the energy storage battery banks in emergency operating states as defined. This is unique to the system operating design and allows for true emergency mode operation.

Sufficient warnings to the operator by the vessel control automation system are provided to alert the operator to adverse equipment conditions. These include the cell by cell monitoring of the energy storage system (batteries), therefore the operating system provides advance notice of any potential adverse equipment condition. The battery cell monitor produces an alarm condition if the cells have a differential voltage in excess of 1 volt DC. The battery monitoring system senses, displays and records the temperature of each individual battery cell. The operating system is programmed to predict a cell failure in advance.

While these embodiments have been described with emphasis on the embodiments, it should be understood that within the scope of the appended claims, the embodiments might be practiced other than as specifically described herein.

What is claimed is:

1. A drive system mounted to a hull of a buoyant vessel for balancing power between electrical devices on the buoyant vessel using a digital signal processor that enables a particular module to respond instantly and correctly to changing voltages, currents, temperatures, thrusters and propellers of the buoyant vessel, the drive system comprises:
   (a) a rectifier for converting AC current to DC current;
   (b) a generator connected to the rectifier;
   (c) an AC bus in communication the rectifier;
   (d) a DC bus in communication with the rectifier;
   (e) a DC/DC converter in communication with the DC bus;

(f) at least one energy storage system with at least one storage unit in bi-directional communication with the DC/DC converter; wherein the DC/DC converter selectively controls bidirectional charging and discharging of the at least one energy storage system and, wherein the energy storage system comprises at least one of: a battery, a battery-ultra capacitor, an ultracapacitor, and capacitors;

(g) an inverter in communication with the DC bus;

(h) a prime mover;

(i) a load regenerating device connected to the inverter, wherein the rectifier is configured to provide regenerated power from the prime mover, load regenerating device, or combinations thereof to the energy storage system; and (j) a control and monitor system in communication with the DC/DC converter, one or more storage units of the at least one energy storage system, the generator; and wherein the control and monitor system has predefined specifications for at least one of: storage units of at least one energy storage system; stored therein and wherein the control and monitor system is adapted to:
  a. automatically controls the DC/DC converter when one or more storage units of an energy storage system or one of the energy storage systems falls below a predetermined load, or the charge level of one or more of the storage units of an energy storage system or one of the energy storage systems is depleted past a preset limit of the charge level thereof;
  b. automatically relieves a current draw from one or more storage units of an energy storage system or one of the energy storage systems;
  c. automatically provides charging current to the one or more storage units of an energy storage system or one of the energy storage systems; and
  d. automatically draw power from at least one of the load regenerating device and the generator, and redirect energy from at least one of the load regenerating device and the generator to the DC/DC converter and then to one or more storage units of an energy storage system or to an energy storage systems.

2. The drive system of claim 1, wherein the control and monitor system has predefined specifications for at least one of: storage units of at least one energy storage system and at least one energy storage system, and wherein the control and monitor system is adapted to: monitor at least one of: the storage units of at least one energy storage system and to automatically start the prime mover.

3. The drive system of claim 1, wherein the control and monitor system has predefined specifications for at least one of: storage units of at least one energy storage system, and at least one energy storage system; and wherein the control and monitor system is adapted to: control the DC/DC converters to ensure one or more storage units of an energy-storage system or one or more energy storage systems are not overcharged.

4. The drive system of claim 1, comprising a plurality of voltage sensors for scaled voltage feedback of the monitored energy storage units or systems when one or more storage units of an energy storage system or one of the energy storage systems voltage is reduced below preset level and a plurality of temperature sensors for determining temperature of the energy storage units.

5. The drive system of claim 3, wherein the control monitor unit reads the plurality of voltage sensors, the plurality of temperature sensors, the thruster load and the propeller load.

6. The drive system of claim 3, wherein the control and monitor system is configured to monitor and control the DC to DC converter levels to control a charging rate of the one or more storage units of an energy storage system or one of the energy storage systems.

7. The drive system of claim 1, wherein the load regenerating device is a winch motor, steering motors, thruster motors, propeller motor, fire pump motors, motor control centers, or combinations thereof.

8. The drive system of claim 6, wherein the control and monitor system prevents generator excitation levels from exceeding a maximum excitation level of the DC bus.

9. The drive system of claim 1, wherein the DC bus in communication with the rectifier is at least one: a split DC bus or a non-split DC bus.

10. The drive system of claim 1, comprising from 2 to 10 DC bus.

11. The drive system of claim 1, further comprising a chopper connected to a resistor for dissipating excess power if one or more storage units or one or more energy storage systems are offline or full of power.

12. The drive system of claim 1, further comprising from 1 inverter to 50 inverters.

13. The drive system of claim 1, wherein the control and monitor system comprises a communication network.

14. The drive system of claim 13, wherein the communication network is at least one of: a global communication network, a local communication network, a cellular communication network, the internet, and a satellite communication network.

15. The drive system of claim 1, wherein the generator and the prime mover can be variable speed, and wherein the generator is variable voltage to control fuel efficiency.

16. The drive system of claim 1, wherein each AC bus is in electrical communication with shore power or a charging system.

17. The drive system of claim 1, wherein a navigation system for operating thrusters, propellers and drive system communicates with the control and monitor system.

* * * * *